United States Patent [19]

Leiss

[11] Patent Number: 5,622,760
[45] Date of Patent: Apr. 22, 1997

[54] SHEETING MADE FROM POLYMERS OF ETHYLENE AND PROPYLENE, AND ITS USE

[75] Inventor: Dirk Leiss, Isernhagen, Germany

[73] Assignee: Benecke-Kaliko AG, Hanover, Germany

[21] Appl. No.: 392,850

[22] PCT Filed: Jul. 1, 1994

[86] PCT No.: PCT/EP94/02158

§ 371 Date: Mar. 27, 1995

§ 102(e) Date: Mar. 27, 1995

[87] PCT Pub. No.: WO95/01390

PCT Pub. Date: Jan. 12, 1995

[30] Foreign Application Priority Data

Jul. 2, 1993 [DE] Germany .......................... 43 22 140.8

[51] Int. Cl.[6] .................................................. C08L 23/04
[52] U.S. Cl. .................. 428/41.3; 428/40.1; 428/213; 428/323; 428/327; 428/332; 428/343; 428/352; 428/409; 525/240
[58] Field of Search ............................ 428/40, 213, 323, 428/327, 332, 343, 352, 409, 41.3; 525/240; 264/175

[56] References Cited

U.S. PATENT DOCUMENTS

| 3,372,049 | 3/1968 | Schaffhausen | 428/343 |
|---|---|---|---|
| 5,439,628 | 8/1995 | Huang | 525/240 |
| 5,486,561 | 1/1996 | Hirano | 525/240 |

FOREIGN PATENT DOCUMENTS

| 0213441 | 3/1987 | European Pat. Off. . |
|---|---|---|
| 2363206 | 6/1974 | Germany . |
| 3015465 | 10/1981 | Germany . |
| 9204518 | 8/1992 | Germany . |
| 1114589 | 5/1968 | United Kingdom . |
| 1346234 | 2/1974 | United Kingdom . |

OTHER PUBLICATIONS

Encyclopedia of Polymer Science and Engineering, 1986, vol. 6, pp. 410–444 and 446–447.

Polypropylene with Rheological Properties suitable for Calendering—Altendorfer, et al —Special reprint from Kunststoffe—German Plastics, (1990/6), pp. 1–4.

Article—Solvay Information—ELTEX P HL 402 and HV 403.

Kunststoff Taschenbuch—24th Edition, pp. 234–371.

Primary Examiner—Nasser Ahmad
Attorney, Agent, or Firm—McAulay Fisher Nissen Goldberg & Kiel, LLP

[57] ABSTRACT

The invention concerns a sheeting based on polymers of propylene and ethylene, which may contain processing aids, fillers, pigments or other additives. This sheeting is characterized by the fact that it comprises a) a propylene homopolymer having a melt flow index (230° C., 2.16 kg) of about 0.8 to 3.0 g/10 min, a melting point Tm of about 154° to 168° C. (determined by DSC) and an E-modulus of about 900 to 1500 N/mm$^2$, and b) an ethylene homopolymer having a melt flow index (190° C./2.16 kg) of about 1.5 to 3.0 g/10 min, a melting point Tm of about 110° to 130° C. and an E-modulus of about 200 to 400 N/mm, whereby about 5 to 20 parts by weight of the ethylene homopolymer are mixed with 100 parts by weight of the propylene homopolymer. It can be used in a self-adhesive composite to laminate any object.

9 Claims, No Drawings

SHEETING MADE FROM POLYMERS OF ETHYLENE AND PROPYLENE, AND ITS USE

BACKGROUND OF THE INVENTION

The invention concerns plastic sheeting based on polymers of propylene and ethylene, which may also contain processing aids, fillers, pigments or other additives, and their use in the form of self-adhesive decorative sheets for coating any objects or molded articles.

Surface sheets for laminating of any objects appear in European Patent Application 0 343 491. These sheets are intended to be applied to the surfaces of objects, such as doors, shelves, or cabinets, of plastic, wood, wood derivatives, metals, or similar materials or substrates in colored, uncolored, or patterned form to provide protection against various undesirable effects such as corrosion, discoloration by light or mechanical action. Under some circumstances they are intended to be shaped to match the surface of the object in question. For instance, such a patterned sheet laminated onto a surface can give the impression of a valuable wood, even on an object that is not suitable for that because of its nature, structure, surface or color. The surface sheeting seen from European Patent Aplication 0 343 491 has a base sheet of a polymer of the methacrylate group. The polymer can be modified by addition of polyacrylates. A polymethyl methacrylate (PMMA) plasticized by polybutyl methacrylate (PBMA) is said to be particularly suitable. The known surface sheeting is said to have improved resistance to light and weathering. It has been found, in testing this sheeting, that it needs improvement. For instance, a plasticized PMMA exhibits relatively high white break or white crackling. Even if this material is modified for high impact, it still has only low impact resistance. It also has unsatisfactorily low wettability or surface tension values. High surface tension values are important for the printability of the basic sheet and for its sticking ability (adhesion between an adhesive layer and the basic sheet). For example, a basic sheet of PMMA has a surface tension of only 36 to 38 dyn/cm (measured according to DIN 53 364).

A sheet of the type indicated initially appears in German Laid-Open Patent 41 21 599. It has a base sheet that contains an ethylene-propylene copolymer, containing processing aids and/or additives and if desired, at least one dye-pigment mixture and/or filler. An adhesive layer is applied to the under surface or underside of the base sheet, along with, if necessary, a cover sheet or release sheet. If desired, the base sheet can have embossing and/or a color-printed layer. The ethylene-propylene polymer used in the 50 to 150 μm thick base sheet has a melt flow index (230° C., 2 kg) of more than 3 g/10 minutes and a tensile strength greater than 30 N/mm$^2$. This sheet is used as a self-adhesive decorative sheet to coat glass, panels, paper, cardboard and other objects or molded articles of metal, wood, or wood derivatives. The known sheet is said to have a Shore hardness D of 55 to 70. Because of the specific starting materials, this known sheeting does not have satisfactory stiffness. The stiffness is important when such a sheet is used to laminate wood and other parts. High stiffness reduces the sensitivity of the laminated sheet to writing and scratches.

SUMMARY OF THE INVENTION

Starting with the state of the technology presented above, the invention was based on the objective of improving the sheeting mentioned initially so as to increase the surface tension of the upper sheet in particular, improve its impact resistance, and prevent white break as much as possible. If it is to be used as a laminating sheet, the laminated sheet should exhibit reduced sensitivity to writing and scratching.

This objective was gained according to the invention by a) a homopolymer of propylene having a melt flow index (230° C., 2.16 kg) of 0.8 to 3.0 g/10 minutes, a melting point, Tm, of about 154° to 168° C. (determined by DSC) and an E-modulus of about 900 to 1500 N/mm$^2$ (determined according to DIN 53 457), and b) a homopolymer of ethylene having a melt flow index (190° C., 2.16 kg) of about 1.5 to 3.0 g/10 minutes, a melting point, Tm, of 110° to 130° C. and an E modulus of about 200 to 400 N/mm$^2$, whereby about 5 to 20 parts by weight of the ethylene homopolymer is mixed with 100 parts by weight of the propylene homopolymer.

The abbreviation "DSC" means Differential Scanning Calorimetry. It is explained in detail in Marti et al., "Angewandte chemische Thermodynamik und Thermoanalytik" [Applied Chemical Thermodynamics and Thermal Analysis] (Experimenta Suppl. 37), Birkhäuser, Basel, 1979.

One special embodiment of the plastic sheeting according to the invention with respect to the physical values stated above appears in claim 2.

PREFERRED EMBODIMENT OF THE INVENTION

The propylene homopolymer preferably has a narrow molecular weight distribution. Such products are commercially available as CR products (CR=Controlled Rheology). A low-density ethylene homopolymer with linear structure (LLDPE) or a low-density polyethylene made under high pressure (LDPE) is particularly suitable as the ethylene homopolymer. The term "homopolymer", in the sense of the invention, is intended to mean that this polymer consists essentially of ethylene or of propylene. It does not by any means mean a "copolymer" in the sense of the existing technology. Other small monomers may accordingly be included, to the extent that they do not impair the desired effect. In general, a "homopolymer" in the sense of this invention includes a polymer containing, along with ethylene or propylene, up to about 10 mole-percent of one or several comonomers, particularly isoprene, 1,3-butadiene, ethylene (in the case of a propylene homopolymer), propylene (in the case of an ethylene homopolymer), butene, hexene, and octene or their isomers.

The properties of the plastic sheeting according to the invention can be modified by additives incorporated into the thermoplastic material. For instance, fillers, such as metal oxides, metal carbonates, especially calcium carbonate and dolomite, metal diuoxides and metal hydroxides; lubricants, such as $C_{12}$–$C_{36}$ fatty acids, fatty alcohols, fatty acid esters and amides; coloring agents in the form of colored pigments such as, for example, titanium dioxide or carbon black, and organic dyes; stabilizers, such as antioxidants and heat stabilizers, e.g., sterically hindered phenols, hydroquinones, substituted representatives of these groups and mixtures of them; UV stabilizers, e.g., various substituted resorcinols, salicylates, benzotriazoles and benzophones; and other usual modifiers. Processing aids, such as high-molecular weight acrylates or acrylate copolymers can also be included as additives. They control the flow properties of the melting process in processing. Due to the initial mixture containing the compounds mentioned above, the sheeting can be produced by any technological process from the initial mixture of the above-mentioned compounds, such as by extruding, calandering, and the like.

One particularly advantgeous embodiment of the plastic sheeting according to the invention also contains an ethylene-propylene copolymer, in which there are about 5 to 40 parts by weight, especially about 10 to 25 parts by weight, of the ethylene-propylene copolymer per 100 parts by weight of the propylene homopolymer. In this case it is preferred that the ethylene-propylene copolymer have a melt flow index (230° C., 2.16 kg) of about 1 to 4 g/10 minutes, a melting point Tm of about 140° to 155° C., and an E-modulus of about 400 to 700 N/mm$^2$. If such a sheet is to be included in a laminating sheet which will be described in more detail below, then the sheet laminated onto any object is characterized by a markedly reduced sensitivity to writing and scratching, and by optimal stiffness and hardness.

The sheeting according to the invention can be used in many forms in quite different areas of application already indicated in the foregoing. For instance, the sheet itself can be pigmented and then it is practical to apply a primer coating to the back preceding a surface treatment, for instance, a corona discharge treatment. Then an adhesive or, if desired, a release layer or removable protective film can be applied to this primer coating. It is also desirable to apply a primer coating to the upper side of the sheet, previously surface-treated by corona discharge. Then a transparent final coating, especially one based on polyacrylate and polyester, is applied to that. The last layer substantially reduces the sensitivity of the surface of the upper sheet to writing.

The following structure of a composite sheet provides a particularly preferred embodiment of the sheeting according to the invention. The upper side of the upper sheet is treated as described above. A decoratively printed layer visible through the transparent upper sheet is applied to the lower side following the primer layer (with previous corona treatment). The upper side can be embossed. The decoratively printed layer mentioned above follows an under-sheet which is bonded by thermal lamination to the upper sheet which is patterned as described above. On the back side of the under-sheet, which preferably comprises the same components as the upper sheet, but is pigmented in order to emphasize the decorative effects, there follows another primer layer (with previous corona treatment), followed by an adhesive coating and, if desired, a release layer, in the form of a siliconized paper, for example. In the composite sheeting described above, which has an upper and a lower sheet, the upper sheet is preferably about 100 to 300 μm thick, especially about 150 to 250 μm, and the composite sheet itself is about 400 to 800 μm, especially 400 to 600 μm thick. The composite sheeting containing the sheet according to the invention is particularly suitable to be a self-adhesive decorative sheet for coating glass, panels, paper, cardboard or other objects or molded articles of metal, wood, wood derivatives and plastic.

In the sheetings according to the invention, the desirable phyusical properties such as high impact strength and high surface tension can be adjusted with white break largely excluded. For instance, the surface tension is from about 46 to 52 dyn/cm (according to DIN 53 364), depending on the manufacturing process. These values are clearly above those attained with the state of the technology initially depicted (36 to 38 dyn/cm in that case). High surface tension improves the printability when colored patterns are applied, for instance, and also improves the adherence of an adhesive layer. The sheetings according to the invention are also characterized by favorable values of the E-modulus, the tensile strength, the hardness, the light-fastness and the high-temperature light-fastness. It also has low sensitivity to writing, high scratch resistance, good chemical resistance, and to a very great extent meets the requirements for lightfastness (according to DIN 54 004). The possibility of applying a varnish, as discussed, assures chemical resistance. The material can be calandered and extruded on commercial production cequipment. The surface can be textured in various ways by embossing equipment. No metal-containing or sulfur-containing stabilizers are needed to produce the desired effects according to the invention, except for plastic mixtures containing PVC, which absolutely require their use. Furthermore, the sheeting according to the invention requires no plasticizers. It is halogen-free, which is advantageous with respect to thermal recycling. It has favorable aging behavior under the influence of heat in the dark (without the effect of light). The desired hardness can also be optimized within the meaning of the invention, so that the previously discussed sensitivity to writing and scratching can be favorably influenced. The sheeting according to the invention can be laminated onto various substrates in many ways, especially in the form of the composite sheets discussed. In that connection there is a possibility of carrying out laminating on the carrier and shaping simultaneously, such as for surfaces that are not two-dimensional. Appropriate equipment works, for example, with membranes, air pressure, and shaping rolls.

The invention will be explained in more detail in the following by means of examples.

EXAMPLES 1 TO 3

Pigmented upper sheets about 0.2 mm thick were produced from the formulations in the following table using a 5-L roll calender. These upper sheets were measured for their various properties, which are also shown in the following table.

TABLE

| | Composition (% by weight) | | |
|---|---|---|---|
| | Example 1 | Example 2 | Example 3 |
| Raw material | | | |
| Propylene homopolymer (Melt flow index (230° C., 2.16 kg) ca. 1.1 g/10 min); Melting point Tm ca. 164–166° C. (DSC); E-modulus 1135 N/mm$^2$ | 50 | 60 | 50 |
| Ethylene homopolymer (Melt flow index (190° C./2.16 kg) 2.3 g/10 min); Melting point Tm 110 to 115° C.; E-modulus 230 N/mm$^2$ | 10 | 10 | 10 |
| Ethylene-Propylene copolymer (Melt flow index (230° C./2.16 kg) 1.5 g/10 min); Melting point Tm ca. 144–150° C. (DSC); E-modulus 550 N/mm$^2$ | 10 | 30 | 40 |
| Primary antioxidant sterically hindered phenol (Hostanox 03 from Hoechst AG) Bis[3,3-bis-(4'-hydroxy-3'-tert.-butylphenyl)butanoic acid] glycol ester | 0.2 | 0.2 | 0.2 |
| UV absorber: sterically hindered amine (Hostavin N20 from Hoechst AG) | 0.3 | 0.3 | 0.3 |

TABLE-continued

|  | Composition (% by weight) | | |
| --- | --- | --- | --- |
|  | Example 1 | Example 2 | Example 3 |
| Pigment/filler | 6 parts* | 6 parts* | 6 parts* |
| Titanium dioxide | | | |
| Properties | | | |
| Lightfastness according to DIN 54 004 | 7–8 | 7–8 | 7–8 |
| Chemical resistance according to DIN 68 861-1B | acceptable | same | same |
| Scratch resistance according to DIN 68862-4C | acceptable | same | same |
| Shore Hardness D according to DIN 53 505 | 71 | 68 | 66 |

*per 100 parts of the polymer mixture

I claim:

1. Plastic sheeting comprising:

a) a homopolymer of propylene having a melt flow index (230° C./2.16 kg) of 0.8 to 3.0 g/10 minutes, a melting point Tm of 154° to 168° C. (determined with DSC) and an E-modulus of 900 to 1500 N/mm$^2$, (determined according to DIN 53 457);

b) a homopolymer of ethylene having a melt flow index (230°/2.16 kg) of 1 to 4 g/10 minutes, a melting point Tm of 110° to 130° C. and E-modulus of 200 to 400 N/mm$^2$; and c) an ethylene-propylene copolymer having a melt flow index (230° C./2.16 kg) of 1 to 4 g/10 minutes, a melting point Tm of 140° to 155° C. and an E-modulus of about 400 to 700 N/mm$^2$, such that 5 to 20 parts by weight of the homopolymer of ethylene and 5 to 40 parts by weight of the ethylene-propylene copolymer are added to 100 parts by weight of the homopolymer of propylene.

2. The sheeting according to claim 1, comprising:

a) a homopolymer of propylene having a melt flow index (230° C./2.16 kg) of about 1 to 2 g/10 minutes, a melting point Tm of about 158° to 164° C. and an E-modulus of about 1100 to 1300 N/mm; and b) a homopolymer of ethylene having a melt flow index (190° C./2.16 kg) of about 1.8 to 2.8 g/10 minutes, a melting point Tm of about 112° to 120° C. and an E-modulus of about 250 to 350 N/mm$^2$.

3. Plastic sheeting according to claim 1 or 2, further comprising a low-density homopolymer of ethylene with a linear structure (LLDPE) and/or a low-density polyethylene produced under high pressure (LDPE).

4. Sheeting according to claim 2 wherein about 8 to 12 parts by weight of the homopolymer of ethylene are added to 100 parts by weight of the homopolymer of propylene.

5. Sheeting according to claim 1, wherein the ethylene-propylene copolymer has a melt flow index (230° C./2.16 kg) of about 1.2 to 2.0 g/10 minutes, a melting point Tm of about 142° to 150° C. and an E-modulus of 500 to 600 N/mm$^2$.

6. Sheeting according to claim 1 while further comprises a varnish layer, embossing or texturing on one side, and an adhesive layer on the opposite side.

7. A composite sheeting having a plastic sheeting according to claim 1 as a first sheet wherein the top sheet is pigmented, embossed or pigmented and embossed.

8. Composite sheeting of claim 7 having a plastic sheeting according to at least one of the foregoing claims as a first sheet and wherein the first sheet is transparent and has a color-printed layer on its under side, and, in this order, a protective under-sheet, an adhesive coat, and a release layer.

9. Composite sheeting according to claim 8, wherein the first sheet is about 100 to 300 μm thick, and the composite sheeting is about 400 to 800 μm thick.

* * * * *

UNITED STATES PATENT AND TRADEMARK OFFICE
CERTIFICATE OF CORRECTION

PATENT NO. : 5,622,760
DATED : APRIL 22, 1997
INVENTOR(S) : Dirk LEISS

It is certified that error appears in the above-indentified patent and that said Letters Patent is hereby corrected as shown below:

TITLE PAGE ITEM:

[75]   Inventor:   Dirk Leiss,   Grossburgwedel, GERMANY

Signed and Sealed this

Seventh Day of October, 1997

Attest:

BRUCE LEHMAN

Attesting Officer

Commissioner of Patents and Trademarks